Figure 9:
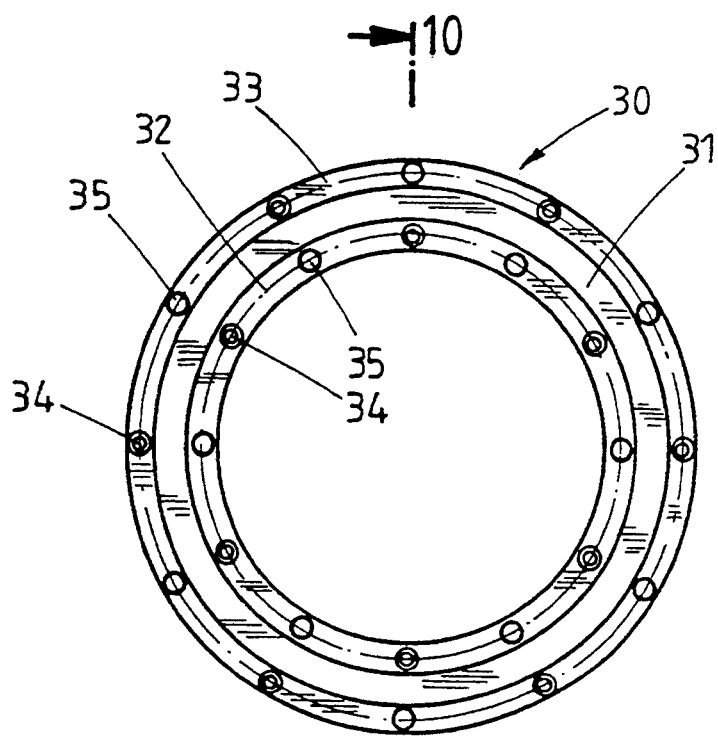

United States Patent [19]
Muller et al.

[11] Patent Number: 5,358,086
[45] Date of Patent: Oct. 25, 1994

[54] FRICTION LINING

[75] Inventors: Ulrich Muller, Heselünne; Norbert Schulz, Marienheide, both of Fed. Rep. of Germany

[73] Assignee: Raybestos Industrie-Produkte GmbH, Fed. Rep. of Germany

[21] Appl. No.: 7,635

[22] Filed: Jan. 21, 1993

[30] Foreign Application Priority Data

Feb. 1, 1992 [EP] European Pat. Off. ........ 92101691.1

[51] Int. Cl.$^5$ .............................................. F16D 69/04
[52] U.S. Cl. ................. 192/107 R; 192/70.13; 192/70.14; 188/218 XL; 188/73.2
[58] Field of Search ............ 192/107 R, 70.13, 70.14; 188/218 XL, 73.2, 250 B

[56] References Cited

U.S. PATENT DOCUMENTS

| | | | |
|---|---|---|---|
| 1,773,533 | 8/1930 | Kattwinkel | 192/107 R |
| 2,850,118 | 9/1958 | Byers | 192/107 R |
| 2,947,388 | 8/1960 | Culbertson | 192/107 R X |
| 3,378,114 | 4/1968 | Hollins | 192/107 R X |
| 3,907,076 | 9/1975 | Crossman et al. | 192/107 R X |
| 3,927,740 | 12/1975 | Zarembka | 192/107 R X |
| 4,010,831 | 3/1977 | Reuter | 192/70.2 |
| 4,641,731 | 2/1987 | Kawaguchi et al. | 192/107 R X |
| 4,747,473 | 5/1988 | Bok et al. | 192/107 R X |

*Primary Examiner*—Vinh T. Luong
*Assistant Examiner*—Andrea Pitts
*Attorney, Agent, or Firm*—Pearne, Gordon, McCoy & Granger

[57] ABSTRACT

A friction lining is designed in particular for clutches and plate-type disc brakes and has an annular body of friction material of which one face forms a friction surface. The annular body has holes distributed around its periphery for the passage of rivets. The holes designed to receive the rivets are arranged in the annular body clear of the friction surface and accordingly do not reduce the area of the friction surface.

16 Claims, 6 Drawing Sheets

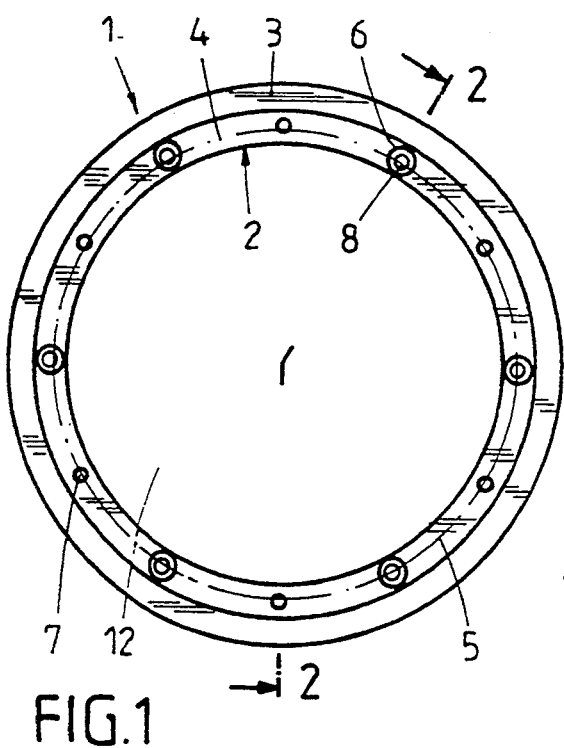
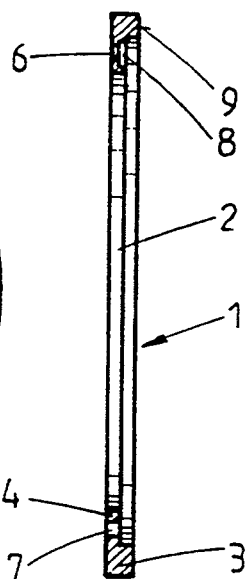
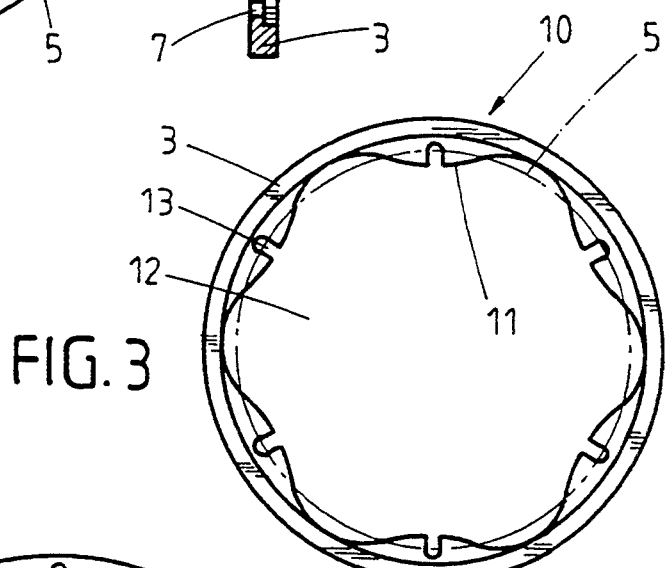
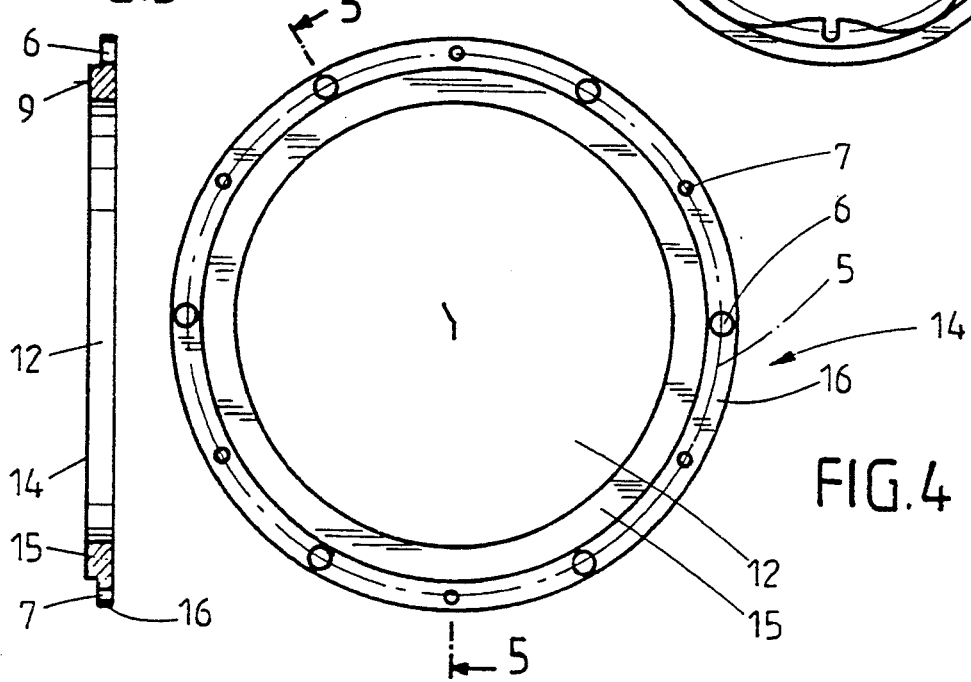

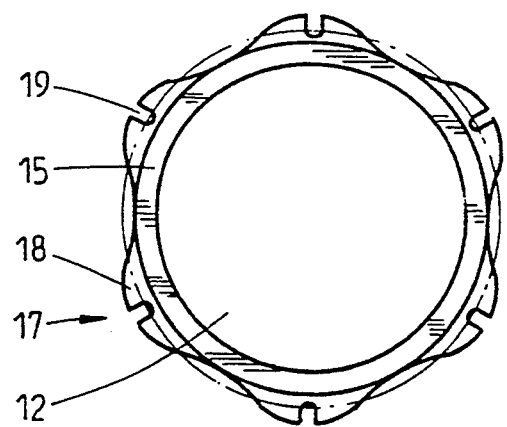
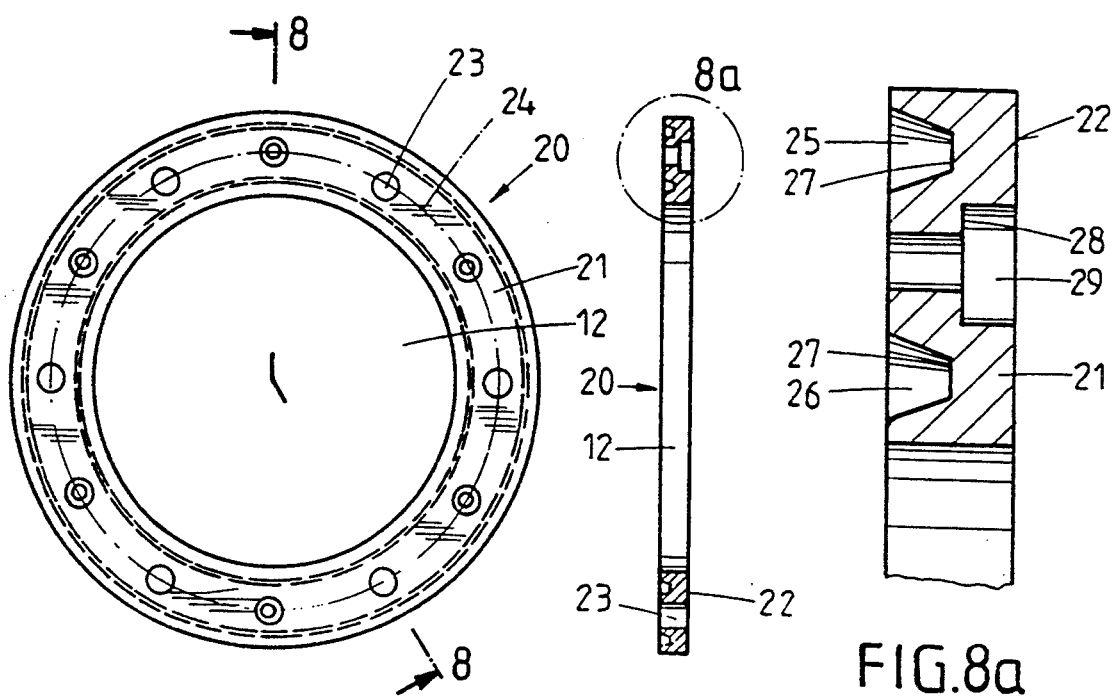

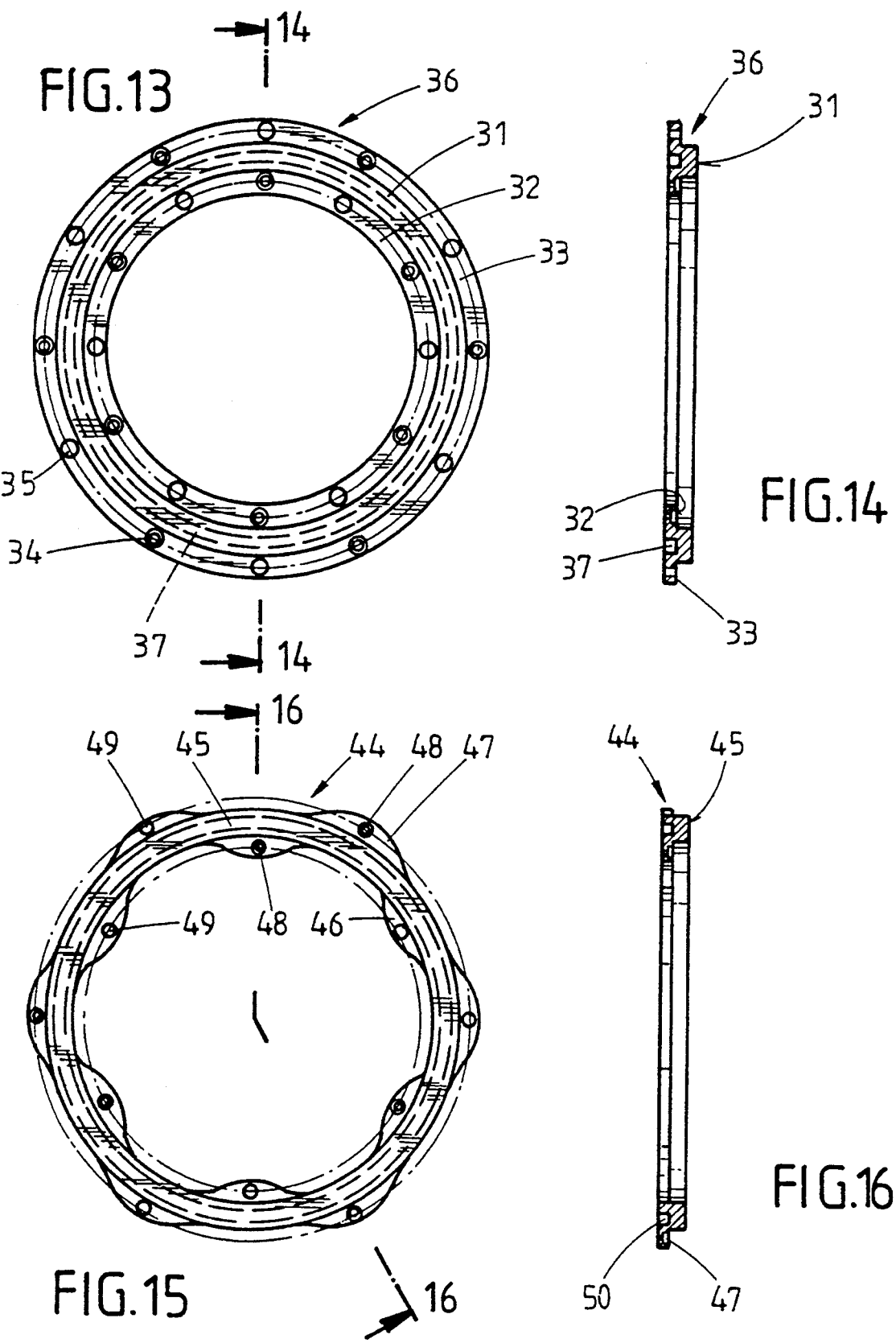

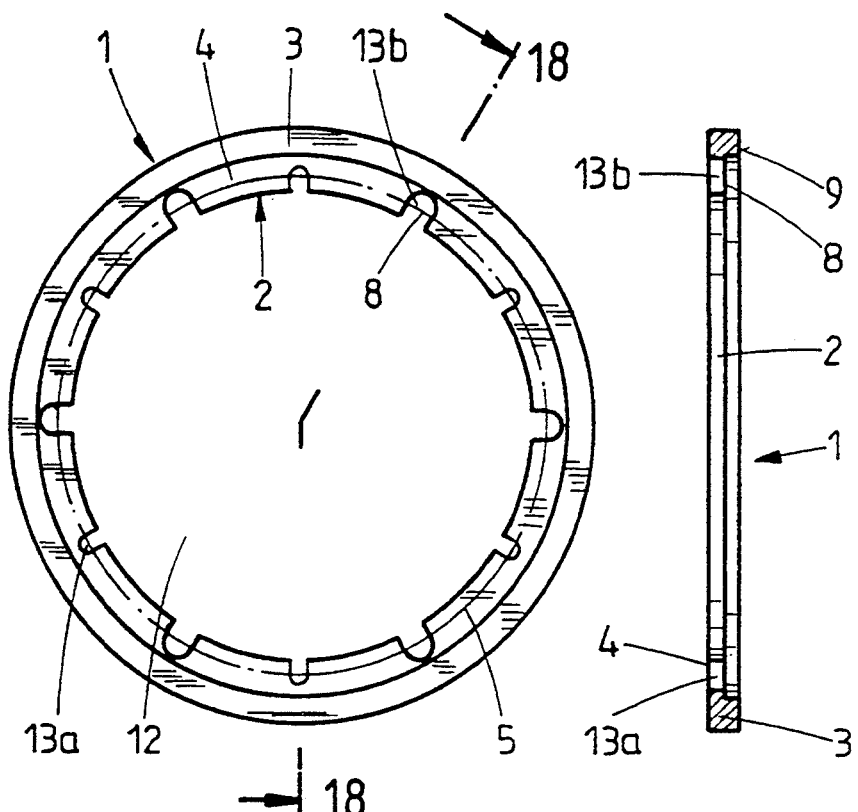
FIG.17
FIG.18
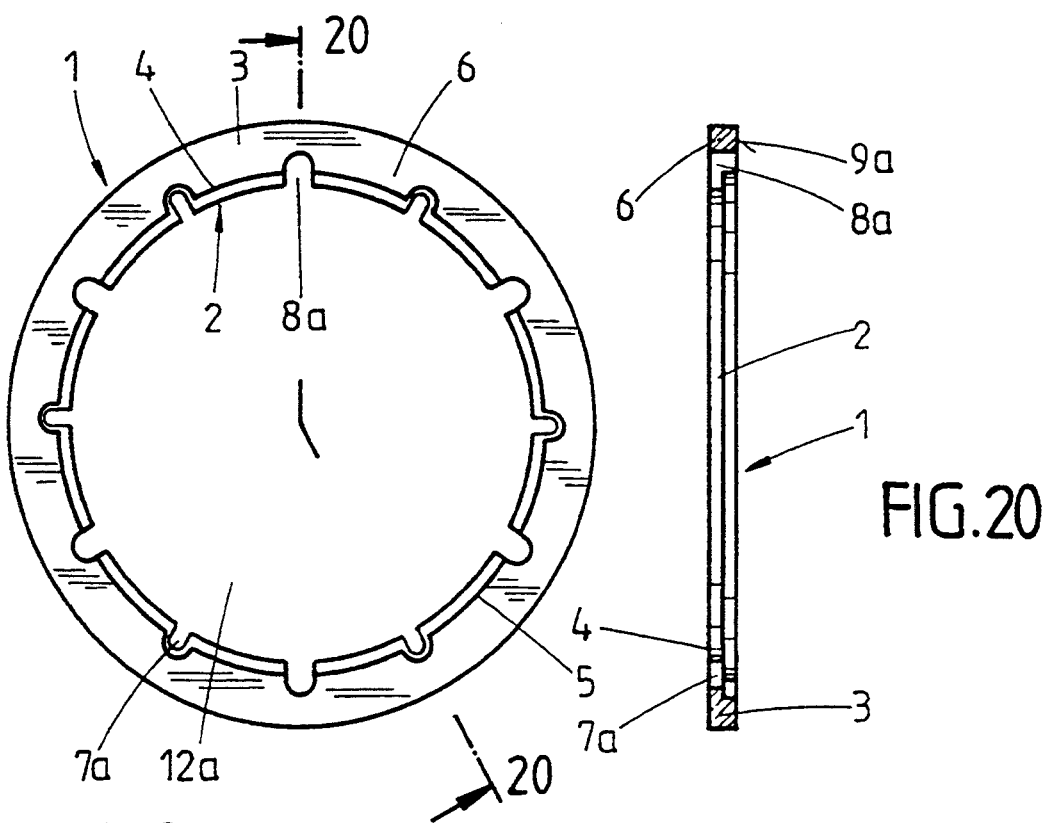
FIG.19
FIG.20

FRICTION LINING

The invention relates to friction linings, in particular clutch linings or brake pads of plate-type disc brakes, comprising an annular body of friction material having a central opening, and of which one face serves as a friction surface, holes being provided in the body to receive rivets.

The invention is based on solving the problem of making a significant improvement in the constancy of the friction characteristics of the friction surfaces and substantially reducing the axial moment of inertia of the friction lining.

The last-mentioned point is particularly important when the friction lining is to be employed in synchronizing clutches of all-synchromesh mechanical gearboxes.

According to a first aspect of the invention, a friction lining for a clutch or disc brake comprises a body of friction material, said body being of annular outline, having means defining a central opening and inner and outer peripheral edges, said body having front and rear axial faces, with said front face forming a friction surface, and rivet-receiving holes provided in at least one of said peripheral edges, said holes being clear of said friction surface.

In the friction lining according to the invention the width of the ring is less than in known friction linings. Furthermore, as the holes provided for attaching the friction lining to a clutch plate or brake pad carrier are presented clear of the actual friction surface, the friction characteristics of the lining are more stable.

The axial moment of inertia of the lining is significantly reduced because on the one hand the mass of the friction lining itself is significantly less and because secondly its shape is such that this reduction in moment of inertia is further assisted by the geometry. The reduction in the moment of inertia of friction linings for clutches of mechanical gearboxes achieves a reduction in the time taken for a gear change, a reduction in the forces involved, a beneficial effect on the changing elements including the synchronizing rings and, not least, an improvement in the smoothness of the change. Thus, with a friction lining according to the invention the moments of inertia of the friction lining can be reduced by between 35 and 70%. If such a lining is introduced into a clutch plate the moment of inertia of the clutch plate thus equipped is reduced between 10 and 35%, thereby still further improving the effectiveness of the clutch.

Where the rivet-receiving holes are arranged in the annular body radially inside and/or outside the friction surface, this results in the further advantage of a constant transmission torque as the range of variation of the friction radius is narrowed by the design. Furthermore, where there are no closed bores in the friction surface, the "pocket" effect known from axial sliding bearings and promoting a variation in friction and thereby so-called fading, is prevented, which adds to the stability of the friction behaviour.

Where the friction surface is provided radially outside the rivet-receiving holes there is an additional gain in space in the central region or in the region of the hub of the disc which carries the friction lining so that for example in clutch discs torsional damping elements of larger diameter can be introduced, whereby gearbox noises can be effectively avoided.

According to a second aspect of the invention, a friction lining for a clutch or disc brake comprises a body of friction material, said body being of annular outline, having means defining a central opening and inner and outer peripheral edges, said body having front and rear axial faces, with said front face forming a friction surface, and rivet-receiving holes provided in at least one of said peripheral edges, said annular body having at least one annular recess in said rear axial face.

This provides a significant reduction in the weight of the friction lining and thereby of its moment of inertia, without having to reduce the friction surface itself, although the latter would also be possible. As the annular recesses provided in the rear face of the friction lining are preferably arranged to be no deeper than the dimension of the rivet base thickness plus rivet head, the thickness of friction lining that can be worn away as a result of wear is not reduced by the presence of these recesses.

By virtue of the invention there are provided novel designs of friction lining or the like which are particularly suitable for synchromesh clutches of motor vehicles but could also be introduced in plate-type disc brakes. Because of an alteration in the geometry or the form of this friction lining the friction behaviour is optimized.

Figure 10:
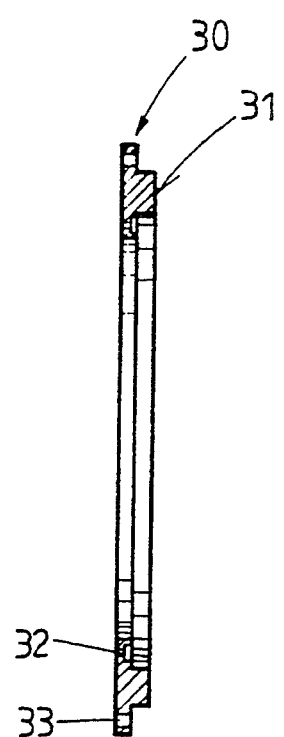
Figure 11:
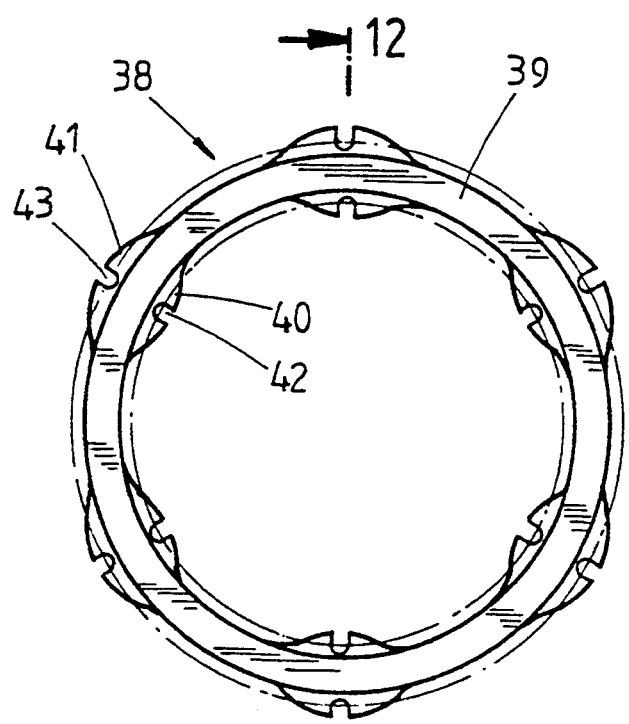
Figure 12:
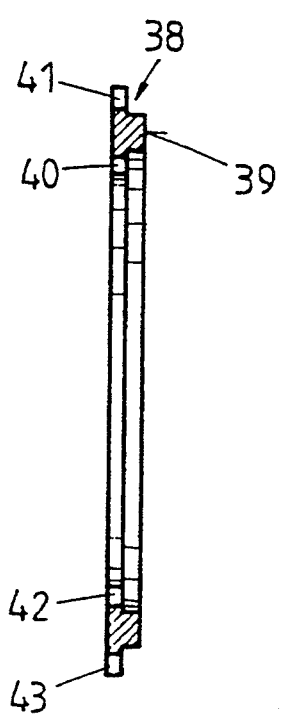
Figures 21, 22:
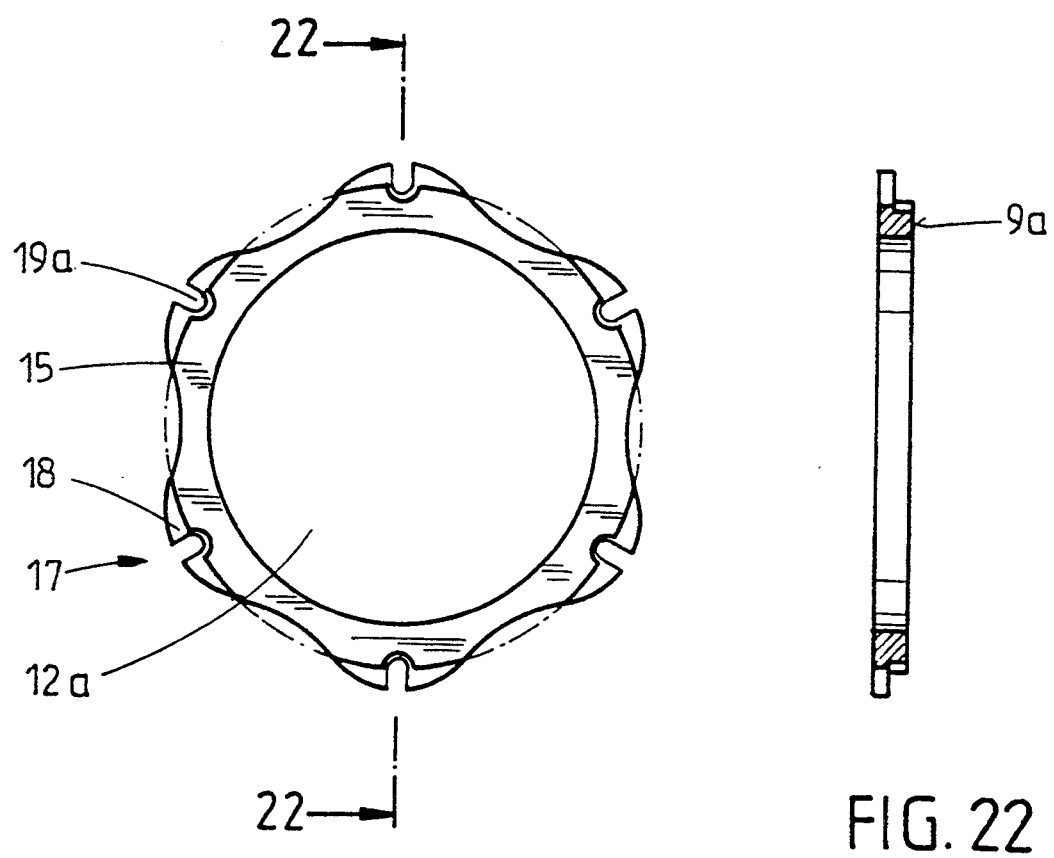

Some embodiments of friction linings according to the invention by way of example are illustrated diagrammatically in the drawing, in which:

FIG. 1 is an elevation of one embodiment of the friction lining in which the friction surface is arranged radially outside the holes provided for receiving rivets, FIG. 2 is a section through the lining of FIG. 1, FIG. 3 is an elevation of a friction lining modified from that of FIG. 1 having friction surfaces lying radially outermost, FIG. 4 is an elevation of a friction lining in which the friction surface is arranged radially inside the holes provided to receive rivets, FIG. 5 is a cross-section of the friction lining of FIG. 4, FIG. 6 is an elevation of a friction lining modified from that FIG. 4 having a radially inwardly disposed friction surface, FIG. 7 is an elevation of a further embodiment of a friction lining according to the invention with annular recesses or grooves in its rear face, FIG. 8 is a cross-section of the taken on line 8—8 of FIG. 7, FIG. 8a shows a detail indicated at 8a in FIG. 8 to a larger scale and FIG. 9 is an elevation of a further embodiment of a friction lining according to the invention with bores serving for riveting provided on the outer and inner periphery clear of the friction area, FIG. 9 is a cross-section of the friction pad of FIG. 9 on the line 10—10, FIG. 11 is an elevation of a further embodiment of a friction lining according to the invention with tongues provided on the outer and inner periphery clear of the friction area and containing radial openings for receiving rivets, FIG. 12 is a cross-section of the friction lining of FIG. 11 on the line 12—12, FIG. 13 is an elevation of a further embodiment of a friction lining according to the invention which is of similar construction to that of FIGS. 9 and 10 but having in the region of the friction area an annular recess or groove extending from the rear face, FIG. 14 is a cross-session of the lining of FIG. 13 on the line 14—14, FIG. 15 is an elevation of a further embodiment of a friction lining according to the invention with bores serving for riveting arranged in wave-like projections on the outer and inner periphery clear of the friction area, FIG. 16 is a cross-section of the friction lining of FIG. 15 on the line 16-16, FIG. 17 is an elevation of a further embodiment of the friction lining similar to that of FIG. 1 but with inwardly open elongated slots, FIG. 18 is a cross-section on the line 18-18 in FIG. 17, FIG. 19 is an elevation of another embodiment of the friction lining provided with inwardly open elongated slots which extend partially into the friction surface, FIG. 20 is a cross-section on the line 20—20 in FIG. 19, FIG. 21 is an elevation of an embodiment of the friction lining modified from that of FIGS. 6 and 7 with outwardly open elongated slots extending partially into the friction surface, and FIG. 22 is a cross-section on the line 22-22 in FIG. 21.

The friction lining illustrated in FIGS. 1 and 2 for a vehicle clutch, not shown, has a round disc-shaped annular body 2 which has in its outer peripheral region a raised annular portion 3 serving as the friction surface and an inner ring 4 set back in relation to this annular portion 3.

The inner ring 4 contains a number of holes 6 and 7 uniformly distributed around a circle 5 for the passage of rivets, not shown here, by which the friction lining 1 is secured to a clutch plate, likewise not shown here, or to a brake pad-backing plate, not shown here. The holes 7 are designed to receive the end of a rivet which is opposite to its head and which is inserted from the opposite side through the clutch plate or brake pad carrier, not shown.

The annular portion 3 which is raised in relation to the inner ring 4 forms on its front face the friction surface 9 of the lining 1.

The friction lining 10 illustrated in FIG. 3 differs from the lining 1 of FIGS. 1 and 2 in that tongues 11 of wavy profile are provided on the inner edge of the annular portion 3 that has the friction surface 9, these tongues extending radially inwards into the central opening 12 of the lining 10 to beyond the circle 5 on which the rivets are arranged. The tongues 11 are set back in relation to the friction surface 9 just like the inner ring 4 of the lining 1. Each tongue 11 contains an elongated slot 13 which is open towards the opening 12. The slots 13 are each intended to receive a rivet, not shown, and are formed by pressing during the production of the lining by a hot pressing process.

The friction lining 14 illustrated in FIGS. 4 and 5 is distinguished by the fact that the central opening 12 is bounded by an annular portion 15 on the front face of which there is the friction surface 9. Arranged around this annular portion 15 and radially outside it there is an outer ring 16 which is thinner in the direction of the axis of the lining than the portion 15, so its outer or front face is set back in relation to the friction face 9 of the annular portion 15. This outer ring 16 again contains holes 6 and 7 uniformly angularly distributed around a circle 5 for the passage of rivets, not shown, as already explained in conjunction with FIGS. 1 and 2.

The friction lining 17 illustrated in FIG. 6 corresponds largely to the lining 10 illustrated in FIG. 3, radially projecting tongues 18 of wavy form in their external contour being formed on the outer periphery of the annular portion 15 having the friction surface 9, the tongues each having an outwardly open elongated hole 19 to receive a rivet, not shown.

In all the embodiments described so far the annular body 2 having the friction surface and containing holes or slots is made in one piece, for example of friction material and pressed or stamped in one piece with and without incorporating reinforcing material.

The friction lining 20 illustrated in FIGS. 7 and 8 also has an annular disc-shaped body 21 which is formed in one piece, for example by pressing or stamping, from friction material with and without reinforcing material incorporated in it.

In this embodiment, however, the annular body 21 has a uniform thickness, its front face or its leading front face being formed as a whole as a friction surface 22. In this embodiment holes 23 designed to receive rivets are arranged circumferentially uniformly distributed on a circle 24 within the friction surface.

As shown in particular in FIG. 8 ring-shaped or circular recesses 25 and 26 are provided on the rear face of the annular body 21 inside and outside the holes 23 which lies on the circle 24, the recesses in the embodiment illustrated by way of example having a trapezoidal cross-section. The bottom 27 of each recess 25 and 26 lies at about the level of the bottom 28 of the recesses 29 which serve to receive the head, not shown, of a rivet, not shown. Accordingly, as the friction lining 21 wears the recesses 25 and 26 provided on this rear face are not exposed until the friction lining has to be replaced anyway because it is worn down to the heads of the retaining rivets.

All the designs of friction lining illustrated in FIGS. 1 to 8 could also be designed for double-row riveting. Examples of this are shown in FIGS. 9 to 16.

FIGS. 9 and 10 show that in an annular friction lining 30 ring-shaped or flange-like projections 32 and 33 are provided on both sides of the friction surface 31 forming the rubbing area and lie radially inside and outside the friction surface 31, being set back in relation to the friction surface as shown in particular in FIG. 10. These projections 32 and 33 each contain, uniformly distributed around their periphery, two different kinds of holes 34 and 35 for the passage of rivets, either with their head lying in a counterbore of the holes 34 or from the opposite side with their shank lying in one of the holes 35.

The friction lining illustrated in FIGS. 13 and 14 differs from the lining 30 of FIGS. 9 and 10 only in that it has in the region of the friction area behind the friction surface 31 an annular circumferentially extending recess 37 of which the depth corresponds approximately to the thickness of the annular projections 32 and 33 which join up flush with the rear face of the friction lining 36. This annular recess 37 serves, as already explained above in a different connection, substantially for saving weight. As the remaining parts of the lining 36 correspond to those of the lining 30 no further description is necessary here.

In the friction lining 38 illustrated in FIGS. 11 and 12 tongues 40 and 41 of wavy shape in elevation are arranged radially inside and radially outside the annular friction surface 39 forming the rubbing area, the tongues each containing a radially extending slot 42 or 43 which is open at its outer end. These slots 42 and 43 serve for the passage of rivets.

As shown in particular in FIG. 12, the tongues 40 and 41 are flush with the rear face of the friction lining 38 but have a smaller thickness than the friction lining in the region of the annular friction surface 39 so that the rivets which are inserted through the slots 42 and 43 are set back in relation to the friction surface 39.

The friction lining 44 shown in FIGS. 15 and 16 again has an annular friction surface 45 forming the friction area, on which there are arranged radially inwardly and radially outwardly projecting tongues 46 and 47 made of wavy profile in plan view. These tongues 46 and 47 are, as shown in FIG. 15, arranged peripherally offset or staggered in relation to one another and each have a hole 48 or 49, the holes 48 being provided with a counterbore to receive the head of a rivet whereas the holes 49 have a cross section which is constant right through and are designed to receive the shank of a rivet inserted from the other side.

Again the tongues 46 and 47 lie flush with the rear face of the friction lining 44 and have a smaller thickness than the lining 44 in the region of the friction surface 45.

A circumferentially extending circular recess 50 or groove is machined in the friction lining 44 from its rear face, its depth corresponding substantially to the thickness of the tongues 46, 47. Accordingly, the lining 44 can be worn away close up to the tongues 46 and 47 without the recess 50 being exposed, reducing the size of the friction surface 45.

The annular recess 50 in the friction lining 44 also has the function of saving weight, as explained more closely already in a different connection.

The friction lining illustrated in FIGS. 17 and 18 is distinguished by the feature that in contrast to the bores illustrated in FIG. 1 the elongated slots are easier to form by a pressing or stamping technique.

The friction lining illustrated in FIGS. 19, 20, 21 and 22 is distinguished by the feature that the elongated slots could in fact extend into the region of the friction surface as, since they are open to one side, they do not introduce the pocket effect known from axial sliding bearings.

What is claimed is:

1. Friction lining for a clutch or disc brake, comprising a body of friction material, said body being of annular outline, having means defining a central opening and inner and outer peripheral edges, said body having front and rear axial faces, with said front face forming a friction surface, and rivet-receiving holes providing in at least one of said peripheral edges, said holes being clear of said friction surface, said body also having first and second radially offset portions with said first portion projecting axially beyond said second portion, said first portion carrying said friction surface and said second portion comprising radial projections containing said rivet-receiving holes, said second radially offset portion comprises radial projections, said rivet-receiving holes being formed as radially elongated slots in said radial projections.

2. Friction lining as claimed in claim 1, wherein said first radially offset portion of said annular body is provided radially outside said second portion.

3. Friction lining as claimed in claim 1, wherein said first radially offset portion of said annular body is provided radially inside said second portion.

4. Friction lining for a clutch or disc brake, comprising a body of friction material, said body being of annular outline, having means defining a central opening and inner and outer peripheral edges, said body having front and rear axial faces, with said front face forming a friction surface, and rivet-receiving holes extending to associated hole bases provided in at least one of said peripheral edges, said annular body having at least one annular recess in said rear axial face, said at least one annular recess extending substantially as far as the bases of said holes receiving said rivet heads.

5. Friction lining as claimed in claim 4, wherein said at least one annular recess has a trapezoidal cross-section.

6. Friction lining as claimed in claim 4, wherein said rivet-receiving holes are arranged on a circle, and said at least one annular recess is radially offset from said circle.

7. Friction lining as claimed in claim 6 wherein said at least one annular recess is provided radially inside said circle.

8. Friction lining as claimed in claim 6 wherein said at least one annular recess is provided radially outside said circle.

9. Friction lining as claimed in claim 1, wherein said second radially offset portion carrying said rivet-receiving holes has a part forming said outer peripheral edge, and a part forming said inner peripheral edge.

10. Friction lining as claimed in claim 9, wherein said at least one annular recess is provided in said rear axial face.

11. Friction lining as claimed in claim 10, wherein said at least one annular recess has a trapezoidal cross-section.

12. Friction lining adapted to be mounted to a clutch plate or a brake pad carrier of a clutch or a disc brake comprising a body of friction material having an annular shape including means defining a central opening, first and second radially offset portions, said first portion carrying a friction surface projecting axially beyond said second portion, and said second portion containing rivet-receiving holes spaced from said friction surfacer said second portion comprising radial projections having said rivet-receiving holes formed therein as radially elongated slots.

13. Friction lining as claimed in claim 12, wherein said first portion is radially inside said second portion.

14. Friction lining adapted to be mounted to a clutch plate or a brake pad carrier of a clutch or a disc brake comprising a body of friction material having an annular shape including means defining a central opening, inner and outer peripheral edges, a front axial face forming a friction surface, a rear axial face, and at least one rivet-receiving hole extending to a hole base in at least one of said peripheral edges, said annular body having at least one annular recess in said rear axial face.

15. Friction lining as claimed in claim 14, wherein said at least one annular recess extends substantially as far as the base of said at least one rivet-receiving hole.

16. Friction lining as claimed in claim 14, including a plurality of rivet-receiving holes arranged on a circle and wherein said at least one annular recess is radially inside said circle.

* * * * *